July 24, 1962 L. PÉRAS 3,045,656
ENGINE VALVE OPERATION
Filed Aug. 1, 1960
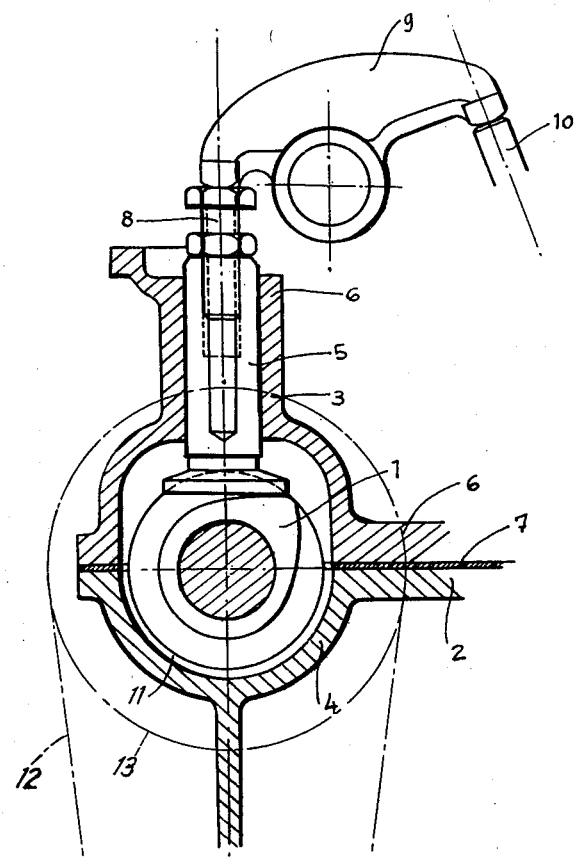
Inventor
Lucien Péras
By Stevens Davis Miller & Mosher
Attorneys

3,045,656
ENGINE VALVE OPERATION
Lucien Péras, Billancourt, France, assignor to Regie Nationale des Usines Renault, Billancourt, France
Filed Aug. 1, 1960, Ser. No. 46,414
Claims priority, application France, Aug. 21, 1959
4 Claims. (Cl. 123—90)

This invention relates to the operation of valves of internal combustion engines and has specific reference to improvements in valve arrangements whereby the camshaft mounting is simplified and some inconveniences of the valve adjustment with respect to the overhead camshaft arrangement are avoided. In conventional types of valve disposal and operation the camshaft revolves in complete bearings located either in the cylinder-block casting, or in the cylinder head.

The improvements constituting the subject-matter of this invention consist in mounting the camshaft in the plane of the joint between the cylinder block and the cylinder head in half or semi-circular bearings cast integrally with the cylinder block, these half or semi-circular bearings being sufficient to maintain the camshaft without adding thereto the complementary bearing shells or caps, due to the combined action exerted on the camshaft by the valve tappets and the camshaft drive means.

The single figure of the attached drawing illustrates diagrammatically a typical form of embodiment of an arrangement for operating overhead valves according to the teachings of this invention in an internal combustion engine.

Referring to the drawing, the camshaft 1 is shown as being mounted in the plane of the joint formed between the cylinder block 2 and the cylinder head 6 in lower half or semi-circular bearings 4 without bearing caps which are cast integrally with the cylinder block 2. The camshaft 1 actuates the valve tappets 5 slidably fitted in bores formed in corresponding portions 3 of the cylinder head 6; the usual gasket 7 is interposed between the cylinder head and the cylinder block. The tappets 5 drive through adjustable rods 8 the rockers 9 acting upon the valve stems 10.

In this arrangement, the camshaft is supported only by the lower bearing shells 11 of the cylinder block and the cylinder head 6 does not engage this camshaft at all so that each bearing consists of an at most semi-circular seating situated in said cylinder block. The camshaft 1 is driven for example through a chain transmission driven in turn by the crankshaft mounted in the cylinder block, but a gear drive is also contemplated. A part of said chain transmission comprising a driving pinion 13 and a chain 12 is shown schematically in the drawing.

If desired, an additional half or semi-circular bearing of same design may be provided on the cylinder block in front of the camshaft driving pinion for mounting the camshaft and properly balance the driving effort of the transmission chain.

It is the combined action of the tappets 5 and of the camshaft driving chain 12 that produces a resultant directed downwardly which is sufficient for maintaining the camshaft in its lower bearing shells.

The camshaft 1 is lubricated either with oil under pressure fed thereto by ducts leading into the bearing shells, or by an oil sump.

The valve arrangement and operation of this invention provides the following advantages characterizing
(a) on the one hand the arrangement comprising a camshaft mounted in the cylinder block:

Easy rocker adjustment;
The cylinder head gasket will not influence the crankshaft-to-camshaft line of centres;
Easy removal of cylinder head without interfering with the camshaft.

(b) on the other hand the overhead camshaft arrangement

Push-rods are eliminated;
Play variations in valve operation are minimized;
Simpler design of cylinder block.

I claim:
1. An internal combustion engine with rocker operated valves comprising a cylinder block, a cylinder head, a camshaft, a joint between the cylinder block and said cylinder head, a camshaft and rocker controlling tappets, bearings integrally cast with said cylinder block and in which said camshaft is rotatably mounted, said tappets being slidably mounted in said cylinder head and bearing upon the cams of said camshaft, each bearing consisting of an at most semi-circular seating situated in said cylinder block, said camshaft being located in the plane of said joint and held in said bearing under the action exerted on said camshaft by said tappets.

2. An internal combustion engine with rocker operated valves comprising a cylinder block, a cylinder head, a camshaft, a timing chain for the driving of said camshaft, a joint between said cylinder block and said cylinder head, a camshaft and rocker controlling tappets, bearings integrally cast with said cylinder block and in which said camshaft is rotatably mounted, said tappets being slidably mounted in said cylinder head and bearing upon the cams of said camshaft, each bearing consisting of an at most semi-circular seating situated in said cylinder block, said camshaft being located in the plane of said joint and held in said bearing under the combined action exerted on said camshaft by said tappets and said timing chain.

3. An internal combustion engine with rocker operated valves comprising a cylinder block, a cylinder head, a camshaft, gear means for the driving of said camshaft, a joint between said cylinder block and said cylinder head, a camshaft and rocker controlling tappets, bearings integrally cast with said cylinder block and in which said camshaft is rotatably mounted, said tappets being slidably mounted in said cylinder head and bearing upon the cams of said camshaft, each bearing consisting of an at most semi-circular seating situated in said cylinder block, said camshaft being located in the plane of said joint and held in said bearing under the combined action exerted on said camshaft by said tappets and said gear means.

4. An internal combustion engine with rocker operated valves comprising a cylinder block, a cylinder head, a camshaft, driving means for the driving of said camshaft, a joint between said cylinder block and said cylinder head, a camshaft and rocker controlling tappets, bearings integrally cast with said cylinder block and in which said camshaft is rotatably mounted, said tappets being slidably mounted in said cylinder head and bearing upon the cams of said camshaft, each bearing consisting of an at most semi-circular seating situated in said cylinder block, said camshaft being located in the plane of said joint and held in said bearing under the combined action exerted on said camshaft by said tappets and said driving means.

References Cited in the file of this patent

UNITED STATES PATENTS

| | | |
|---|---|---|
| 898,448 | Domville | Sept. 15, 1908 |
| 1,494,923 | Lavoie | May 20, 1924 |
| 1,877,051 | Read | Sept. 13, 1932 |
| 2,291,483 | Miller | July 28, 1942 |
| 2,865,691 | Muller | Dec. 23, 1958 |

FOREIGN PATENTS

| | | |
|---|---|---|
| 46,396 | Holland | Aug. 15, 1939 |